United States Patent [19]

Mallett

[11] 4,259,789

[45] Apr. 7, 1981

[54] SIMULATION TECHNIQUE FOR GENERATING A SUDDEN OPEN CIRCUIT ON HIGH CURRENT LINES

[75] Inventor: John H. Mallett, Brighton, England

[73] Assignee: The Singer Company, Binghamton, N.Y.

[21] Appl. No.: 123,631

[22] Filed: Feb. 22, 1980

Related U.S. Application Data

[63] Continuation of Ser. No. 900,467, Apr. 27, 1978, abandoned.

[51] Int. Cl.³ .............................................. G09B 25/02
[52] U.S. Cl. .................................... 434/366; 434/30; 434/301
[58] Field of Search ............. 35/10, 10.2, 12 D, 12 F, 35/12 N, 12 W, 13, 19 A; 324/415, 418, 420, 423, 424; 364/801, 802

[56] References Cited

U.S. PATENT DOCUMENTS

| 2,796,683 | 6/1957 | Hayne | 35/19 A |
|---|---|---|---|
| 2,877,569 | 3/1959 | Eisenberg | 35/13 |
| 2,924,890 | 2/1960 | Salisbury | 35/19 A X |
| 3,061,945 | 11/1962 | Hawkins | 35/13 |
| 3,582,927 | 6/1971 | Primavera | 340/381 |
| 3,604,128 | 9/1971 | Homann | 35/13 |
| 3,772,590 | 11/1973 | Mikulecky et al. | 324/424 |
| 3,832,790 | 9/1974 | Fryer et al. | 35/10 |

OTHER PUBLICATIONS

*Application Notes by Hamlin Electronics, Inc.*, Feb. 1971, pp. 1–12.

Fox, R. W., *Practical Trial/SCR Projects for the Experimentor*, Apr. 1974, p. 114.

Primary Examiner—Vance Y. Hum
Attorney, Agent, or Firm—Douglas M. Clarkson; Jeff Rothenberg

[57] ABSTRACT

A simulated open circuit on high current electrical lines is generated, such that high currents, including transient currents, do not interact with and adversely effect the low current digital computer electronics which control the simulation. A bi-directional triode thyristor in its non-conducting state is triggered to enter its conducting state allowing current to flow through the thyristor and to trip a circuit breaker connected to the output of the thyristor. The tripping allows the thyristor to reset itself to its non-conducting state and to be ready for any new triggering signal.

2 Claims, 3 Drawing Figures

SIMULATION TECHNIQUE FOR GENERATING A SUDDEN OPEN CIRCUIT ON HIGH CURRENT LINES

BACKGROUND OF THE INVENTION

This is a continuation of Ser. No. 900,467 which was filed Apr. 27, 1978, now abandoned.

FIELD OF THE INVENTION

This invention relates to a method and apparatus for generating a simulated sudden open circuit on high current electric lines, and relates more particularly to an improved method and apparatus for simulating the tripping of a circuit breaker employed in circuitry used in aircraft training simulators.

DESCRIPTION OF THE PRIOR ART

Electrical circuit breakers, devices which become open circuited when a specified current level is flowing within them, are commonly employed in various applications as protective devices to prevent electrical damage under such conditions as an overload of electrical current in the wires of an electrical circuit. Modern aircraft, and particularly the large complex commercial and military versions, employ a great deal of electrical circuitry to control flight instruments, operating equipment, and other devices aboard the aircraft. As the electrical circuit network becomes complex, large numbers of circuit breakers become necessary in the electrical network. High currents can be found flowing through the electrical lines mandating high current circuit breakers.

When aircraft personnel are learning the procedures that must be employed in operating an aircraft, they must acquire knowledge of the steps to be taken when a malfunction in the electrical system occurs, such as an overload occurring in a circuit whereby a circuit breaker is tripped.

A modern well known method of training aircraft personnel is by utilizing an aircraft simulator. In a simulator the trainee is placed in a realistically recreated aircraft environment, which contains to a large extent actual aircraft equipment. However, outside the recreated aircraft is a modern electronics and mechanical system that generates conditions so that the trainee feels he is in and operating an actual aircraft without ever leaving the ground. This external system is characterized by modern, low current digital computer circuitry.

As part of the aircraft simulation, actual circuit breakers found in the aircraft's electrical circuitry are used. These circuit breakers are typically within the trainee environment since the aircraft operator usually has an option to manually trip a circuit breaker in addition to the automatic electrical tripping that would occur during current overload.

Prior art simulators, in order to provide a realistic training environment have included actual circuit breakers for high current lines. In order to present to the trainee a situation of a sudden overload, or short circuit, for example, whereby a circuit breaker becomes tripped, the instructor must be able to selectively recreate this condition. In modern simulators, this is done by instructing a digital computer to generate a signal that will cause a relay to close, thereby short circuiting the electrical line through the relay so that high current is diverted through an associated circuit breaker, causing it to trip. A monitoring line usually samples the voltage on the shorted line and feeds the voltage back to the computer, which, in turn, alerts the instructor that the circuit breaker has been tripped.

The prior art technique has many disadvantages. Because the relay is situated in a high current circuit breaker line, the relay must be physically large to handle the high current that trips the circuit breaker. When large quantities of circuit breaker lines, each of which must employ large high current cable, are necessary, as in the case in simulating aircraft electrical system, a large quantity of relays must be used. Designers can't decide at the last minute that a relay is desirous and simply install it. Designers must carefully allocate areas in the system to accommodate this massive collection of wires and relays. If appropriate areas are not available long lengths of line become necessary. These relay networks become space-limiting, cumbersome, and expensive. In addition, when a relay short circuits a line so that a circuit breaker is tripped, high transient currents occur in said line as a result of the sudden relay latching. This heavy duty network of cable and relays is typically situated near low current networks. The low current networks can be adversely effected by the high current network and particularly effected by the high transient current.

Digital computers and their associated circuitry are essentially low current devices. When high values of current come in close proximity to these low current digital networks, erroneous signals can be easily generated in the digital control electronics due to the coupling of electromagnetic radiation from the high currents and transients into the low current digital system. When errors in the digital computer are generated, the simulation becomes faulty. False signals can activate undesired mechanical and electrical responses and create an inaccurate environment for the trainee, thereby defeating the purpose of simulation training and rendering a multi-million dollar system ineffective.

Therefore, a need exists for a way to generate a sudden open circuit on high current lines and particularly in an aircraft simulator, in such a manner that high currents do not interact with associated digital computer type circuitry. With labor, cost of materials, and system expenses rising under modern-day economic trends it is also necessary to perfect such simulation techniques in a most cost effective manner. Furthermore, as more and more electrical circuitry is incorporated into actual aircraft electrical systems, and more simulation detail is required for optimum training realism, the size of the electrical devices and networks employed to generate this detail must be kept small, compact, and be easily accessible for installation and servicing.

SUMMARY OF THE INVENTION

It is, therefore, a principal object of the present invention to provide a simple, cost effective method and apparatus for generating a simulated sudden open circuit on high current lines such that high currents, including transient currents, do not interact with and adversely affect any associated nearby low current digital computer control electronics.

It is another object of the present invention to provide a simple, cost effective method and apparatus for tripping circuit breakers in electrical circuits used in simulated aircraft training devices.

According to the present invention, a semi-conductor device, a bi-directional triode thyristor for example, is triggered by a signal responsive to the desire of an instructor operating an aircraft simulator training device in attempting to create an open circuit on electrical lines. This triggering causes the device to allow current generated by a voltage applied to its input terminal to flow through itself and to trip a circuit breaker connected to the output terminal of the device, with said tripping also causing the device to be ready for any new signal to be generated responsive to any new desire to the instructor.

The foregoing and other features and advantages of the present invention will become more apparent in light of the following detailed description of the preferred embodiment thereof as illustrated in the accompanying drawings.

DETAILED DESCRIPTION

Silicon bi-directional triode thyristors, commonly referred to by various manufacturers as triacs, are semi-conductor devices capable of carrying high current and operating in such a way that, when a gate signal is applied to a trigger terminal, current is permitted to flow from an input port to an output port, and such current will continue to flow after the gate signal is removed. The triac will reset itself to a non-conducting input-to-output signal path, when the current ceases to flow in the input-to-output path. The triac will then be ready to be again triggered into the input-output state. Triacs are proven, reliable, low-cost, compact devices.

Figure 1:
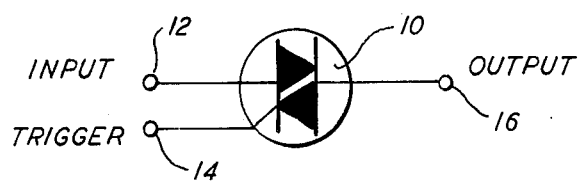
FIG. 1 is a schematic representation of the bi-directional triode thyristor.

FIG. 1 schematically represents a triac 10 useful in the present invention. Triac 10 has an input terminal 12, a trigger terminal 14, and an output terminal 16.

When the triac is triggered, which can be by a low current short duration pulse, the input-output port of the device is essentially short circuited. In the preferred embodiment of the present invention, the input-output path of a triac is connected in series with one lead of an aircraft type circuit breaker. The other lead of the circuit breaker is held at a reference or ground potential. The input terminal of the triac is placed at a convenient supply voltage potential. In essence, when a pulse is applied to the trigger terminal the supply voltage will conduct current through the triac to the circuit breaker and then to ground. Once the triac has short circuited, the high current that flows from the voltage supply to ground will cause the circuit breaker to trip, putting the line back at an open circuit state. Once current ceases to flow in the input-output path of the triac, the triac will open circuit itself and will then be automatically reset for another triggering pulse to activate it. Using this approach, the triac, being very small, can easily be placed in intimate contact with the circuit breaker so that high current will flow in a small confined area, namely through the triac and circuit breaker to ground. High current capacity cabling is not required. With high current carrying cable not needed the risk of interference with low current circuits is eliminated.

Figure 2:
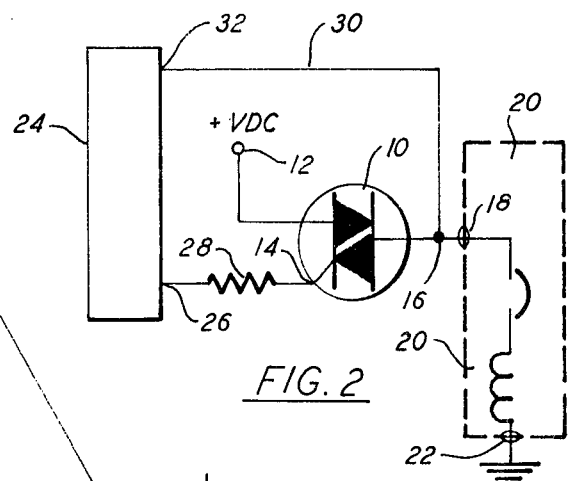
FIG. 2 is a schematic representation of the preferred embodiment of the present invention.

FIG. 2 shows a schematic representation of the preferred embodiment of the invention as it is used in conjunction with the digital computer control electronics employed in an aircraft simulator. Each circuit breaker in the electrical network of the aircraft that is being simulated can be easily interfaced with a triac and in turn the triacs connected to the computer by standard low current lines. The input connections from the computer are standard low current connections familiar to those skilled in the art. For the sake of clarity only one typical circuit breaker line is shown in FIG. 2. As illustrated therein, a triac 10 is connected to a voltage source (e.g., +26 volts DC) at terminal 12. The triac output terminal 16 is connected to terminal 18 of circuit breaker 20. The other circuit breaker terminal 22 is connected to a point at ground potential. The trigger input terminal 14 is connected to a computer 24 at terminal 26, which provides a triggering pulse through a current regulating resistor 28 (e.g., 470 ohms). When the trigger is applied, the voltage source will conduct current through the triac to trip the circuit breaker.

A voltage monitoring line 30 is connected at output terminal 16 and, in turn, attached to the computer 24 at terminal 32. Line 30 serves to let the instructor know when point 16 is at ground potential. When point 32 monitors a ground, computer 24 generates a signal (not shown) indicating to the instructor that the circuit breaker is not open circuited. The instructor can then command the computer to trigger the triac. When the circuit breaker trips, line 30 will let the instructor know that point 16 is now not at ground potential. The trainee's reactions to the sudden open circuit can then be studied.

Figure 3:
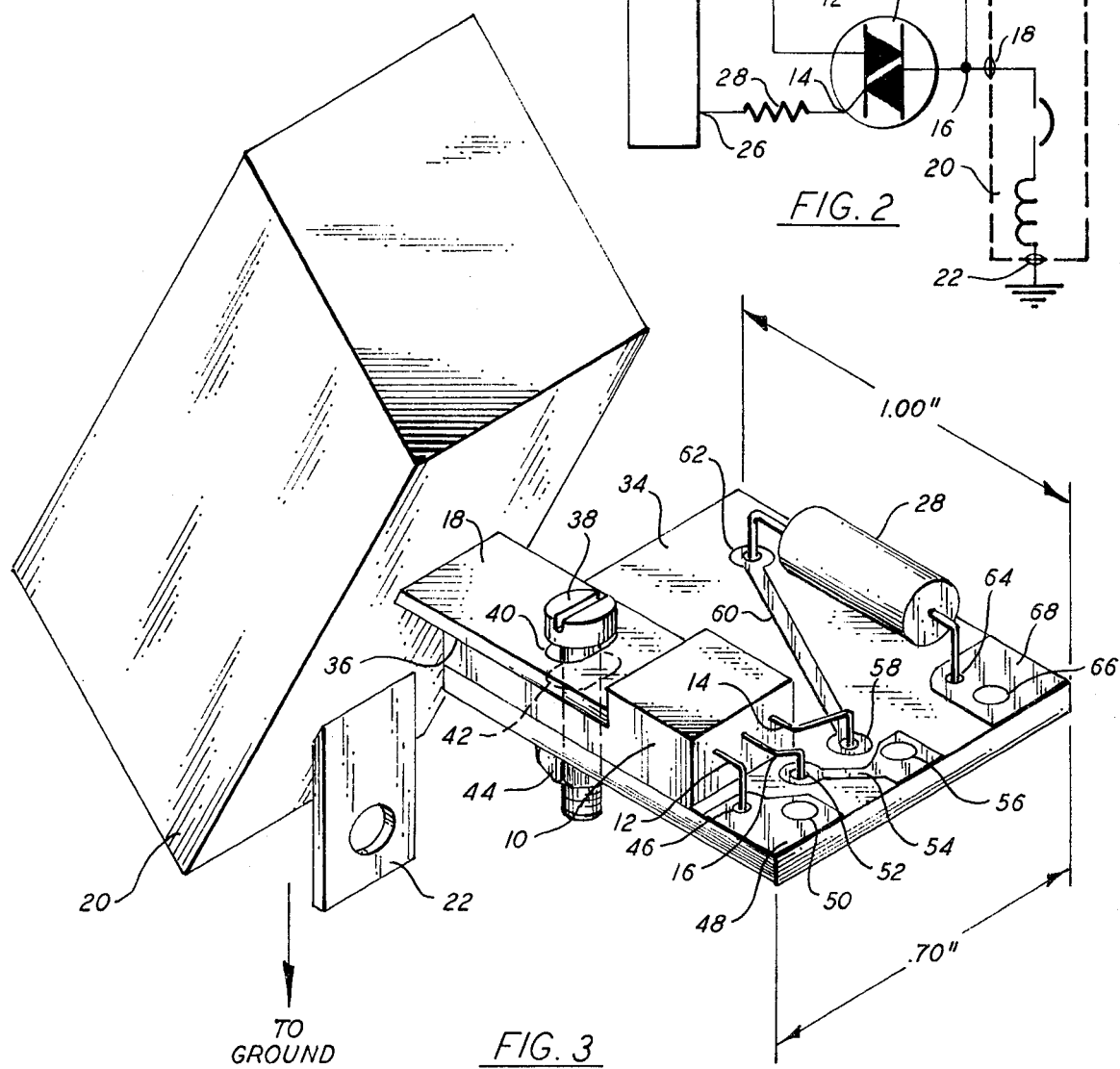
FIG. 3 is a perspective view of the preferred embodiment of the present invention.

Referring to FIG. 3, it will be seen that the triac readily lends itself to modular printed circuitry, thereby providing a small compact network. Triac 10, exemplified in this embodiment by a low cost commercial device currently manufactured by Texas Instruments and labeled as Model TIC226B, can be easily attached to a printed circuit board 34 by soldering and mechanical means. As manufactured, this model triac has output terminal 16 electrically connected to the triac conductive outer shell. Therefore, electrical connections between the triac output terminal 16 and circuit breaker terminal 18 can be obtained by mechanically connecting terminal 18 to the triac outer shell at point 36. Circuit breaker terminal 18 becomes attached to the triac shell which in turn is attached to circuit board 34 using screw 38. Screw 38 passes through one circuit breaker terminal mounting hole 40 and also passes through a mounting hole 42 of the triac. Nut 44 secures the circuit breaker, triac, and circuit board firmly in place. The other circuit breaker terminal 22 can be connected to ground in any standard manner, by a ground bus bar, for example. Triac input terminal 12 is soldered to the printed circuit board at point 46, and printed circuit conducting line element 48 brings this connection point to the edge of the circuit board for easy accessibility to a standard +26 volt DC supply at lug receptacle 50. Triac output terminal 16 is soldered to the printed circuit board at point 52, and conducting line 54 brings this connection point to the edge of the circuit board for easy accessibility to the computer at lug receptacle 56. Trigger terminal 14 is soldered to the printed circuit board at point 58, and printed circuit conducting line 60 allows 470 ohm resistor 28 to be soldered to the printed circuit board at point 62 and 64, and printed circuit conducting lines 68 allows connection point 64 to be also brought to the edge of the circuit board for easy accessibility to the computer at lug receptacle 66.

As dimensioned in FIG. 3, the compact nature of this circuit, easily adaptable to a 1.0 inch by 0.70 inch circuit board, has significantly reduced the size of the network that will generate an open circuit or other malfunction that could trip a circuit breaker in aircraft training simulators. The use of bulky relay and cable networks and the high current problems that are associated with these bulky relay and cable networks are not necessary. Many circuit breakers can readily adapt this circuit with easy installation and result in compact circuit breaker arrays. Juggling of large relay networks is not necessary if equipment servicing is required. Designers do not have to carefully allocate areas in the system to accommodate a massive collection of wires and relays. Last minute changes are easy. Thus high current lines can become easily isolated from the low current digital control electronics and do not cause erroneous signals to be present in the digital circuitry.

This invention has been described in terms of tripping circuit breakers of electrical networks used in aircraft simulators. It will be readily apparent to those skilled in the art that this invention can be practiced where any open circuit condition is to be generated without the use of relays and cabling and especially when it is desirable to confine high currents and segregate them from low current networks which may be sensitive to any high current interaction. It will be also apparent to those skilled in the art that various changes and modifications may be made without departing from the invention. Fuses could replace circuit breakers. The triac could be replaced by a uni-directional thyristor, commonly known as a thyristor, or by high current integrated circuit chips. The invention, is, therefore, intended to cover herein all such changes and modifications as fall within the true spirit and scope of the invention as defined by the appended claims.

What is claimed is:

1. In a simulator having instruments, devices and electrical leads which can be affected adversely by spurious electric currents induced electro-magnetically, apparatus for generating a localized electrical overload current to simulate a circuit-breaker-protected electrical network malfunction by applying a localized overload current simulative of an overload of the network directly to a simulator circuit breaker, comprising:

circuit breaker means in a simulator for providing an open circuit in response to said localized overload current, electrical gate means, normally non-conductive, electrically connected to and physically adjacent said circuit breaker means, capable of conducting said localized overload current in response to a predetermined control trigger pulse, and capable of sustaining said localized overload current flow after the removal of said control trigger pulse, overload current source means connected to said electrical gate means for providing an electrical current of a magnitude comparable to the current generated in an actual electrical network malfunction, and control means positioned remotely from said electrical gate means and responsive to a predetermined event for providing said control trigger pulse, whereby when said control trigger pulse is applied to said electrical gate means in response to said predetermined event, said localized overload current will flow from said overload current source means to said circuit breaker means and will continue to flow after said control trigger pulse is removed until said localized overload current is interrupted by the opening of said circuit breaker means, which interruption causes said electrical gate means to reset itself to said non-conducting state.

2. In a simulator as set forth in claim 1 wherein said electrical gate means is physically attached to said circuit breaker means.

* * * * *